United States Patent
Sedlacek et al.

(10) Patent No.: US 8,908,597 B2
(45) Date of Patent: Dec. 9, 2014

(54) METHODS AND APPARATUS FOR SUPPORTING THE IMPLEMENTATION OF IMS SERVICE CONTINUITY

(75) Inventors: Ivo Sedlacek, Landskrona (SE); Fredrik Lindholm, Stockholm (SE); Jan Holm, Gavle (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 84 days.

(21) Appl. No.: 13/197,138

(22) Filed: Aug. 3, 2011

(65) Prior Publication Data

US 2013/0028179 A1 Jan. 31, 2013

Related U.S. Application Data

(63) Continuation of application No. PCT/EP2011/063022, filed on Jul. 28, 2011.

(51) Int. Cl.
*H04W 4/00* (2009.01)
*H04L 29/06* (2006.01)

(52) U.S. Cl.
CPC ........ *H04L 65/1016* (2013.01); *H04L 65/1073* (2013.01)
USPC .......................................... 370/328; 370/329

(58) Field of Classification Search
CPC ..... H04W 80/04; H04W 84/12; H04W 88/06; H04W 88/08; H04W 84/18
USPC .................. 370/328, 329, 330, 331
See application file for complete search history.

(56) References Cited

U.S. PATENT DOCUMENTS

| 2003/0134618 A1* | 7/2003 | Pradhan et al. | 455/412 |
| 2005/0276229 A1* | 12/2005 | Torabi | 370/252 |
| 2006/0094415 A1* | 5/2006 | Veron | 455/419 |
| 2006/0276192 A1* | 12/2006 | Dutta et al. | 455/436 |

(Continued)

FOREIGN PATENT DOCUMENTS

| WO | WO 2010/129427 A1 | 11/2010 |
| WO | WO 2011/079223 A1 | 6/2011 |

OTHER PUBLICATIONS

3GPP TS 24.229 v10.3.0 (Mar. 2011), $3^{rd}$ Generation Partnership Project; Technical Specification Group Core Network and Terminals; IP multimedia call control protocol based on Session Initiation Protocol (SIP) and Session Description Protocol (SDP); Stage 3 (Release 10), 702 pages.

(Continued)

*Primary Examiner* — Michael J Moore, Jr.
*Assistant Examiner* — Siren Wei
(74) *Attorney, Agent, or Firm* — Myers Bigel Sibley & Sajovec, P.A.

(57) ABSTRACT

According to a first embodiment of the present invention there is provided a method of operating a node of a communications network that is configured to provide an IP Multimedia Subsystem Access Transfer Control Function. The method comprises storing information regarding IMS Service Continuity features that are supported by Mobile Switching Center servers within the network. Upon receipt of a message requesting IMS registration of a user equipment using the information to determine the IMS Service Continuity features that may be available to the user equipment, and, for any IMS Service Continuity features that may be available, including an indication that the IMS Service Continuity feature may be available in the message, and forwarding the message towards a Service Centralization and Continuity Application Server.

11 Claims, 5 Drawing Sheets

(56) References Cited

U.S. PATENT DOCUMENTS

| | | | |
|---|---|---|---|
| 2010/0040020 A1* | 2/2010 | Chen | 370/331 |
| 2010/0311386 A1* | 12/2010 | Edge et al. | 455/404.1 |
| 2010/0312832 A1* | 12/2010 | Allen et al. | 709/204 |
| 2011/0161508 A1* | 6/2011 | Kim et al. | 709/228 |
| 2011/0182235 A1* | 7/2011 | Shaheen et al. | 370/328 |

OTHER PUBLICATIONS

3GPP TS 23.228 v11.0.0 (Mar. 2011), $3^{rd}$ Generation Partnership Project; Technical Specification Group Services and Systems Aspects; IP Multimedia Subsystem (IMS); Stage 2 (Release 11), 272 pages.

3GPP TS 24.008 v10.2.0 (Mar. 2011), $3^{rd}$ Generation Partnership Project; Technical Specification Group Core Network and Terminals; Mobile radio interface Layer 3 specification; Core Network protocols; Stage 3 (Release 10), 634 pages.

3GPP TS 23.216 v11.0.0 (Mar. 2011), $3^{rd}$ Generation Partnership Project; Technical Specification Group Services and System Aspects; Single Radio Voice Call Continuity (SRVCC); Stage 2 (Release 11), 50 pages.

3GPP TS 24.237 v10.2.0 (Mar. 2011), $3^{rd}$ Generation Partnership Project; Technical Specification Group Core Network and Terminals; IP Multimedia (IM) Core Network (CN) subsystem IP Multimedia Subsystem (IMS) Service Continuity; Stage 3 (Release 10), 202 pages.

3GPP TS 23.237 v11.0.0 (Mar. 2011), $3^{rd}$ Generation Partnership Project; Technical Specification Group Services and System Aspects; IP Multimedia Subsystem (IMS) Service Continuity; Stage 2 (Release 11).

International Search Report, PCT Application No. PCT/EP2011/063022, Apr. 4, 2012, 5 pages.

Written Opinion of the International Searching Authority, PCT Application No. PCT/EP2011/063022, Apr. 4, 2012, 7 pages.

"Universal Mobile Telecommunications System (UMTS); LTE; IP Multimedia (IM) Core Network (CN) subsystem IP Multimedia Subsystem (IMS) service continuity; Stage 3 (3GPP TS 24.237 version 10.3.0 Release 10)" Jun. 1, 2011, XP014065906, 210 pages.

Notification of Transmittal of the International Preliminary Report on Patentability, Application No. PCT/EP2011/063022, Date of Mailing: Dec. 17, 2013; 13 pages.

* cited by examiner

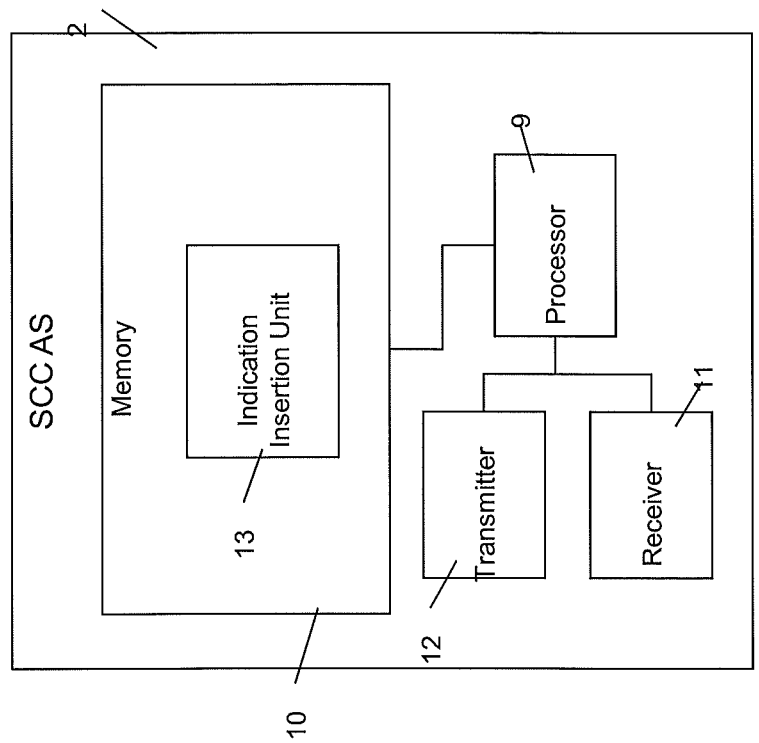
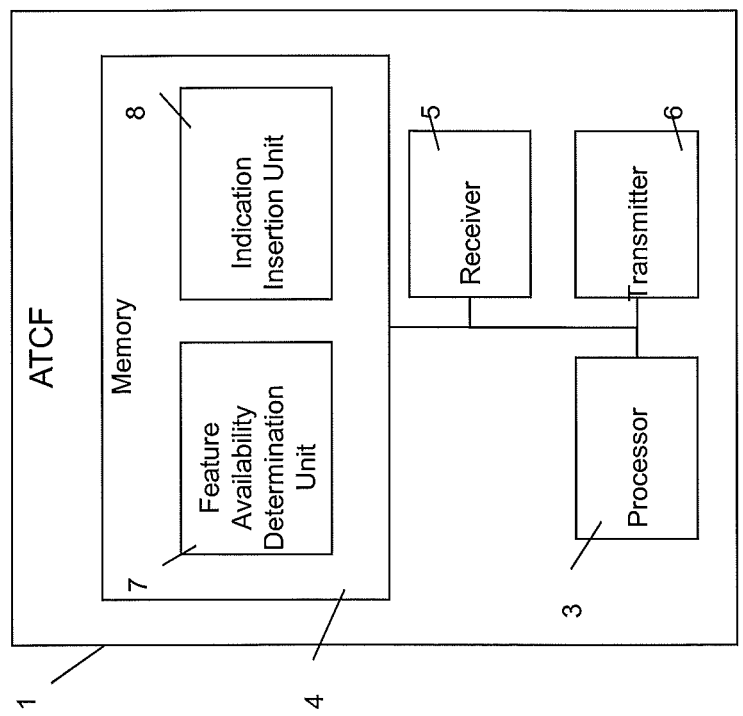
Figure 6
Figure 5

METHODS AND APPARATUS FOR SUPPORTING THE IMPLEMENTATION OF IMS SERVICE CONTINUITY

CROSS REFERENCE TO RELATED APPLICATION

The present application claims priority to PCT International Application No. PCT/SE2011/063022, filed Jul. 28, 2011, the disclosure of which is incorporated herein by reference as if set forth fully herein.

TECHNICAL FIELD

The present invention relates to methods and apparatus for supporting the implementation of IP Multimedia Subsystem (IMS) Service Continuity. More particularly, the invention relates to methods and apparatus for determining and communicating the support of IMS Service Continuity features for a user equipment (UE) located in a serving network.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP), Existing cellular network deployments are dominated by the 2G and 3G standards. The process of rolling out so-called 4G networks has just begun, and it will be many years before 4G network coverage is sufficient to allow 2G and 3G networks to be withdrawn completely. A fundamental requirement for real-time service provision is the seamless handover of services for subscribers roaming across cell boundaries of the radio access network (RAN). Given the ongoing co-existence of 2G, 3G and 4G networks, it is particularly desirable to allow for the handover of real-time service connections such as voice calls between the different radio access technologies.

Considering further the 4G technology, this is being specified under the name LTE (Long Term Evolution) and SAE (System Architecture Evolution) in 3GPP. The LTE radio access network technology implements only a packet switched access, in contrast to 2G and 3G (using GERAN and UTRAN radio access network technologies respectively) which provide for both packet switched and circuit switched access. In 2G and 3G networks, packet switched connections are used to carry data whilst circuit switched connections are used for real-time services such as voice calls. In 4G networks, all services will be carried via packet switched connections. In the case of a voice call initiated when a user is attached to a LTE radio access network (termed Evolved UTRAN or E-UTRAN), that call will make use of a packet switched connection. If it is necessary for the call to be transferred to a 2G or 3G radio access network, e.g. because the user roams out of the coverage area of the E-UTRAN and into that of a GERAN or UTRAN network, the call must be switched from a packet switched (PS) access to a circuit switched (CS) access (i.e. an Access Transfer is required). Of course, the process for implementing the handover must be seamless such that little or no disruption of the call is perceived by the user. An appropriate access handover mechanism is also required in the case of the handover of a call from a PS access using a 3G UTRAN (HSPA) access network to a CS call using either 3G UTRAN access or 2G GSM access.

Interworking solutions for IMS Centralized Services (ICS) as specified in 3GPP TS 23.292, "IP Multimedia Subsystem (IMS) centralized services; Stage 2", allows IMS sessions using CS bearers to be treated as standard IMS sessions, which is required for the purpose of IMS Service Continuity. ICS defines signalling mechanisms between the UE and IMS for transport of information to centralise the service in the IMS, and TS 23.237 "IP Multimedia Subsystem (IMS) Service Continuity" defines the additional procedures needed for service continuity when using CS access for media transport. Within the context of TS 23.292 and TS 23.237, the further 3GPP document TS 23.216: "Single Radio Voice Call Continuity (SRVCC); Stage 2", describes a mechanism for handing over a voice call from a PS to a CS access.

FIG. 1 illustrates schematically an example of the Single Radio Voice Call Continuity (SRVCC) architecture for providing Access Transfer of a voice call from a PS to a CS access. In this example, a user terminal (or User Equipment, UE, according to 3G terminology) has initiated a voice call using a LTE radio access network (i.e. PS access) which is subsequently to be handed over to either a Universal Terrestrial Radio Access Network (UTRAN) or a GSM/Edge Radio Access Network (GERAN) (i.e. CS access). The call is established using the IMS network described above and which provides a common service control network for the PS and CS domains provided through the LTE, UTRAN, or GERAN radio accesses. In order to implement the Access Transfer, media control must be transferred from the Evolved Packet Core (EPC) network of the 4G domain to an allocated Mobile Switching Centre (MSC) Server within the 2G/3G domain. Other components illustrated in FIG. 1 include a Serving/PDN gateway (S/PDN-GW), a Mobility Management Entity (MME) (both the S/PDN-GW and the MME reside within the EPC), and a Home Subscriber Server that resides within a subscriber's home network.

With reference to FIG. 1, IMS Service Continuity requires a Service Centralization and Continuity (SCC) Application Server (AS) (shown as co-located with an MMTel AS in FIG. 1), and a UE with SC capabilities. In addition, an Access Transfer Control Function (ATCF) and an Access Transfer Gateway (ATGW) may also be used in the serving network (visited if roaming), with the ATCF/ATGW providing additional IMS Service Continuity functions. In this regard, delegating part of the Access Transfer functionality to an ATCF provides advantages related to voice interruption during session handover etc, as the ACTF is located in the same network as the user. In particular, according to 3GPP TS23.237, it is recommended that the ATCF be co-located with one of the existing functional entities within the serving network (e.g. P-CSCF, IBCF, or MSC Server). When SRVCC enhanced with ATCF is used, the ATCF is included in the session control plane for the duration of the call both before and after Access Transfer. The ATGW is controlled by the ATCF and stays in the session media path for the duration of the call and after Access Transfer. The ATGW supports transcoding after SRVCC handover in case the media that was used prior to the handover is not supported by the MSC server.

3GPP TS23.237 and 3GPP TS24.237 define a number of features that may be required in order to support IMS Service Continuity. For example, these features may include but are not limited to the MSC server assisted mid-call feature, SRVCC for calls in alerting state (also known as SRVCC for calls in alerting phase or access transfer for calls in alerting phase), SRVCC for video calls, and multimedia priority services for SRVCC. As such, during the establishment of a session, the SCC AS will indicate to a UE if any of these features are to be applied in any subsequent access transfer that may occur (see 3GPP TS24.237 section 7.3.2 and 8.3.2), However, the SCC AS will only indicate that a feature is to be applied if that feature is supported by the UE, the SCC AS and the MSC servers in the network where the UE is registered and which can be involved in the SRVCC procedures.

In order to indicate their support for any IMS Service Continuity features, a functional entity is required to include the corresponding media feature-tag in a SIP request or a SIP response (see 3GPP TS 24.237 Annex C). However, the SCC AS only interacts with the MSC servers in the network where the UE is registered when access transfer has been initiated. The SCC AS is therefore required to know whether the MSC servers within the serving network support any of these IMS Service Continuity features before it has received any indication from the MSC servers. As such, in order to meet the 3GPP Release 9 and Release 10 standards, it would be necessary to pre-configure the SCC AS with a database indicating whether the MSC servers within a serving network (e.g. V-PLMN) support any of these features. The SCC AS is therefore required to store this information for all of the visited networks into which a UE could roam (e.g. for all V-PLMNs with which the H-PLMN has a roaming agreement). However, maintaining such a database within each SCC AS can be problematic. It would therefore be advantageous if the SCC AS could be aware of the serving networks support for any IMS Service Continuity features without the need for this information to be provided by a pre-configured database.

SUMMARY

It is an object of some embodiments of the present invention to provide a SCC AS located within a home network with information regarding the IMS Service Continuity features that may be available to the UE within a serving network.

According to a first embodiment of the present invention there is provided a method of operating a node of a communications network that is configured to provide an IP Multimedia Subsystem (IMS) Access Transfer Control Function (ATCF). The method comprises storing information regarding IMS Service Continuity features that are supported by Mobile Switching Center (MSC) servers within the network. Upon receipt of a message requesting IMS registration of a user equipment (UE) using the information to determine the IMS Service Continuity features that may be available to the UE, and, for any IMS Service Continuity features that may be available, including an indication that the IMS Service Continuity feature may be available in the message prior to forwarding the message.

The message requesting IMS registration of the user equipment may be sent towards a Serving-Call Session Control Function (S-CSCF) within a home network of the UE. The message requesting IMS registration of the UE may be a SIP REGISTER request. The method ATCF may be located within a serving network providing the UE with access to a home network. The ATCF may therefore be located in a visited network for a roaming UE.

The step of using the information to determine the IMS Service Continuity features that can be provided to the user equipment may comprise identifying the IMS Service Continuity features that are supported by the MSC servers in the network. In addition, the step of using the information to determine the IMS Service Continuity features that can be provided to the UE may further comprises one or more of:
  identifying the IMS Service Continuity features that are supported by the ATCF; and
  identifying the IMS Service Continuity features that the UE is authorized to use.

The step of identifying the IMS Service Continuity features that the UE is authorized to use may be based upon one or more of:
  a policy defined for the network; and
  if the UE is roaming in the network, a roaming agreement between the network and a home network of the UE.

The method may further comprise receiving the message requesting IMS registration of the user equipment from the user equipment, and inserting any indications that IMS Service Continuity features are supported prior to forwarding the message to the IMS of the home network.

The IMS Service Continuity features may comprise one or more of:
  MSC server assisted mid-call feature;
  Single Radio Voice Call Continuity, SRVCC, for calls in alerting state;
  SRVCC for video calls; and
  multimedia priority services for SRVCC.

According to a second embodiment of the present invention there is provided a method of operating a node of a communication network that is configured to provide an IP Multimedia Subsystem (IMS) Service Centralization and Continuity Application Server (SCC AS). The method comprises receiving a message requesting IMS registration of a user equipment within a serving network, the message including indications of any IMS Service Continuity features that may be available to the user equipment in the serving network, and using these indications to support IMS Service Continuity.

The IMS Service Continuity features may comprise one or more of:
  MSC server assisted mid-call feature;
  Single Radio Voice Call Continuity, SRVCC, for calls in alerting state;
  SRVCC for video calls; and
  multimedia priority services for SRVCC.

The method may further comprise receiving the message requesting IMS registration of the user equipment, the message having been sent via an Access Transfer Control Function (ATCF) located within the serving network, the ATCF having inserted the indications of any IMS Service Continuity features that are supported by MSC servers within the serving network.

The message requesting IMS registration may be received from a Serving-Call Session Control Function (S-CSCF)

within the network. The message requesting IMS registration may be a third party SIP REGISTER request.

The step of using the indications to support IMS Service Continuity may further comprise one or more of:
  when SVRCC access transfer of one or more IMS sessions of the user equipment is required, using these indications to determine which of the one or more sessions can be transferred; and
  using these indications to determine which of the IMS Service Continuity features are supported for the user equipment, and notifying the user equipment of the IMS Service Continuity features that are supported.

The step of notifying the user equipment of the IMS Service Continuity features that are supported may further comprise, for any IMS Service Continuity features that the message requesting IMS registration of the user equipment indicated may be available, including an indication that the IMS Service Continuity feature may be available in a further message sent toward the user equipment in order to establish an IMS session.

The further message may be one of a request to establish an IMS session, and a response to a request to establish an IMS session. The further message may therefore be one of a SIP INVITE request, a SIP 200 OK SIP 180, and SIP 183 response.

According to a third embodiment of the present invention there is provided an apparatus configured to operate as an IP Multimedia Subsystem (IMS) Access Transfer Control Function (ATCF) within a communications network. The apparatus comprises a memory for storing information regarding IMS Service Continuity features that are supported by Mobile Switching Center (MSC) servers within the network, a receiver for receiving a message requesting IMS registration of a user equipment, a processor that, upon receipt of the message, uses the information to determine the IMS Service Continuity features that may be available to the user equipment, and, for any IMS Service Continuity features that may be available, includes an indication that the IMS Service Continuity feature may be available in the message, and a transmitter for forwarding the message including any indications.

The processor may be configured to insert any indications that IMS Service Continuity features are supported prior to forwarding the message to the IMS of the home network. The transmitter may be configured to forward the message requesting IMS registration of the user equipment is sent towards a Serving-Call Session Control Function (S-CSCF) within a home network of the user equipment.

When using the information to determine the IMS Service Continuity features that may be available to the user equipment, the processor may be configured to identify the IMS Service Continuity features that are supported by the MSC servers in the network. When using the information to determine the IMS Service Continuity features that may be available to the user equipment, the processor may be further configured to perform one or more of:
  identifying the IMS Service Continuity features that are supported by the ATCF; and
  identifying the IMS Service Continuity features that the user equipment is authorized to use.

The processor may be further configured to identify the IMS Service Continuity features that the user equipment is authorized to use based upon one or more of:
  a policy defined for the network; and
  if the user equipment is roaming in the network, a roaming agreement between the network and a home network of the user equipment.

The memory may be configured to store information regarding IMS Service Continuity features that comprise one or more of:
  MSC server assisted mid-call feature;
  Single Radio Voice Call Continuity, SRVCC, for calls in alerting state;
  SRVCC for video calls; and
  multimedia priority services for SRVCC.

The processor may be configured to process indications regarding IMS Service Continuity features that comprise one or more of:
  MSC server assisted mid-call feature;
  Single Radio Voice Call Continuity, SRVCC, for calls in alerting state;
  SRVCC for video calls; and
  multimedia priority services for SRVCC.

According to a fourth embodiment of the present invention there is provided an apparatus configured to operate as an IP Multimedia Subsystem (IMS) Service Centralization and Continuity Application Server (SCC AS) within a communication network. The apparatus comprises a receiver for receiving a message requesting IMS registration of a user equipment within a serving network, the message including indications of any IMS Service Continuity features that may be available to the user equipment in the serving network, and a processor for using these indications to support IMS Service Continuity.

When using the indications to support IMS Service Continuity, the processor may be configured to perform one or more of:
  when SVRCC access transfer of one or more IMS sessions of the user equipment is required, using the indications to determine which of the one or more sessions can be transferred; and
  using the indications to determine which of the IMS Service Continuity features are supported for the user equipment, and notifying the user equipment of the IMS Service Continuity features that are supported.

When notifying the user equipment of the IMS Service Continuity features that are supported, the processor may be configured to:
  for any IMS Service Continuity features that the message requesting IMS registration of the user equipment indicated may be available, include an indication that the IMS Service Continuity feature may be available in a further message sent toward the user equipment in order to establish an IMS session.

The processor may be configured to include an indication that the IMS Service Continuity feature may be available in a further message that is one of:
  a request to establish an IMS session; and
  a response to a request to establish an IMS session.

The apparatus may further comprise a transmitter for sending the further message to the user equipment. The transmitter may be configured to send a further message that is one of:
  a request to establish an IMS session; and
  a response to a request to establish an IMS session.

The apparatus may further comprise a memory for storing any received indications of any IMS Service Continuity features that may be available to the user equipment in the serving network.

The processor may be configured to process indications regarding IMS Service Continuity features that comprise one or more of:
  MSC server assisted mid-call feature;
  Single Radio Voice Call Continuity, SRVCC, for calls in alerting state;

SRVCC for video calls; and
multimedia priority services for SRVCC.

The receiver may be configured to receive the message requesting IMS registration from a Serving-Call Session Control Function (S-CSCF) within the network.

The receiver may be configured to receive a request to establish an IMS session from the user equipment, and the processor may be configured, upon receipt of a response to the request, to insert any received indications that an IMS Service Continuity features is supported into the response prior to forwarding the response to the user equipment.

The receiver may be configured to receive a request to establish an IMS session with the user equipment, and the processor may be configured, upon receipt of the request, to insert any received indications that an IMS Service Continuity features is supported into the request prior to forwarding the request to the user equipment.

According to a further embodiment there is provided a computer program comprising computer program code adapted to perform all the steps of one of the first embodiment and second embodiment when said computer program code is run on a computer. According to a yet further embodiment the computer program resides on a computer readable medium.

BRIEF DESCRIPTION OF THE DRAWINGS

FIG. 5 illustrates schematically an example of an ATCF suitable for implementing the methods described herein; and FIG. 6 illustrates schematically an example of an SCC AS suitable for implementing the methods described herein.

DETAILED DESCRIPTION

Figure 1:
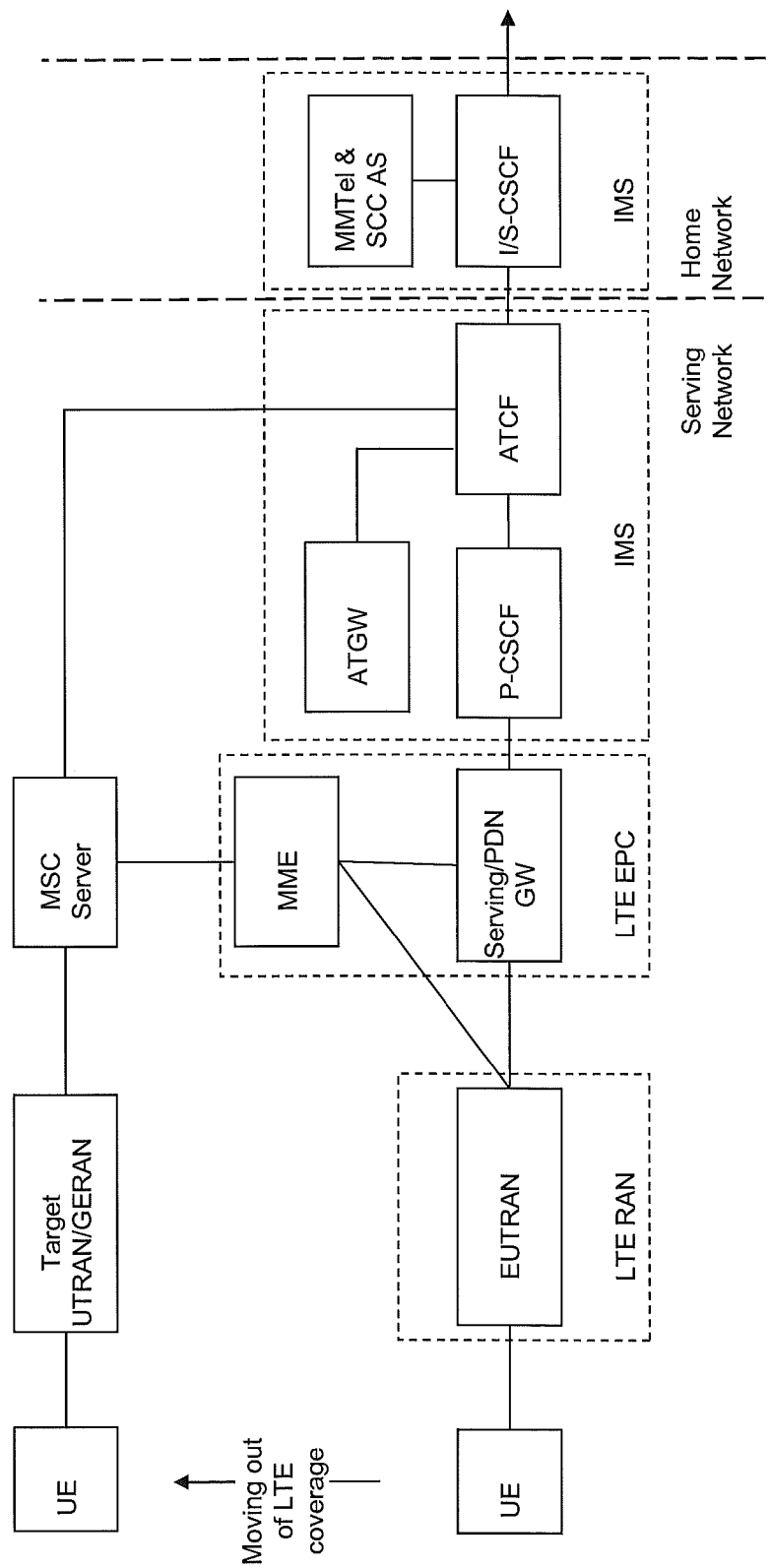
FIG. 1 illustrates schematically an example of the Single Radio Voice Call Continuity (SRVCC) architecture.

In order to overcome the problems identified above there will now be described a method of providing a SCC AS located within a home network with information regarding the IMS Service Continuity features that may be available to the UE within a serving network. The method involves having an entity within the serving network provide this information to the SCC AS when the UE is registered with the IMS from the serving network.

In this regard, it is recognised here that IMS sessions from and to a UE are anchored at the SCC AS in the home network and may also be anchored at the ATCF in the serving (visited if roaming) network in order to provide Service Continuity for the user during transition between two access networks. As such, when SRVCC enhanced with ATCF is used to provide IMS Service Continuity, the ATCF is included in the signalling path during IMS registration of a UE, and it would therefore be convenient to have the ATCF include the information regarding the IMS Service Continuity features that may be available to the UE within the serving network during the IMS registration. This information can then be provided to the SCC AS during the third party registration of the UE (i.e. when the S-CSCF in the home network performs a third party registration to the SCC AS).

In order to implement this method, the ATCF within the serving network can be configured with information regarding the IMS Service Continuity features that are supported by the MSC servers located within the serving network. The ATCF can then use this information to determine the IMS Service Continuity features that may be available to a UE from which it has received a message requesting IMS registration. For any IMS Service Continuity features that the ATCF determines may be available to the UE, the ATCF can then include an indication that the IMS Service Continuity feature may be available in the message requesting IMS registration, prior to forwarding the message towards the home network of the UE.

To determine the IMS Service Continuity features that may be available to the user equipment, the ATCF can use the information regarding the MSC servers in the network to identify the IMS Service Continuity features that are supported by those MSC servers. The ATCF would then determine that an IMS Service Continuity feature may be available to the user equipment if this information indicates that the IMS Service Continuity feature is supported by the MSC servers in the serving network.

Alternatively, when determining the IMS Service Continuity features that may be available to the UE, the ATCF can use the information regarding the MSC servers in the network to identify the IMS Service Continuity features that are supported by those MSC servers, and can also take into account whether or not it supports the IMS Service Continuity features and/or whether or not the UE is authorized to use the IMS Service Continuity features. For example, if the ATCF were to take into account whether or not the UE is authorized to use the IMS Service Continuity features, the ATCF could base it's determination upon a policy defined for the network and/or any roaming agreements that exist between the serving network and a home network of the UE.

If the ATCF were to also take into account whether or not it supports the IMS Service Continuity features, then the ATCF would only determine that an IMS Service Continuity feature may be available to the UE if the information indicates that the IMS Service Continuity feature is supported by the MSC servers in the serving network and if it is determined that the IMS Service Continuity feature is supported by the ATCF. Alternatively, if the ATCF were to take into account whether or not the UE is authorized to use the IMS Service Continuity features, then the ATCF would only determine that an IMS Service Continuity feature may be available to the user equipment if the information indicates that the IMS Service Continuity feature is supported by the MSC servers in the serving network and if it is determined that the UE is authorized to use the IMS Service Continuity features. As a further alternative, if the ATCF were to take account whether or not it supports the IMS Service Continuity features and whether or not the UE is authorized to use the IMS Service Continuity features, then the ATCF would only determine that an IMS Service Continuity feature may be available to the UE if the information indicates that the IMS Service Continuity feature is supported by the MSC servers in the serving network, if it is determined that the IMS Service Continuity feature is supported by the ATCF, and if it is determined that the UE is authorized to use the IMS Service Continuity features.

Figure 2:
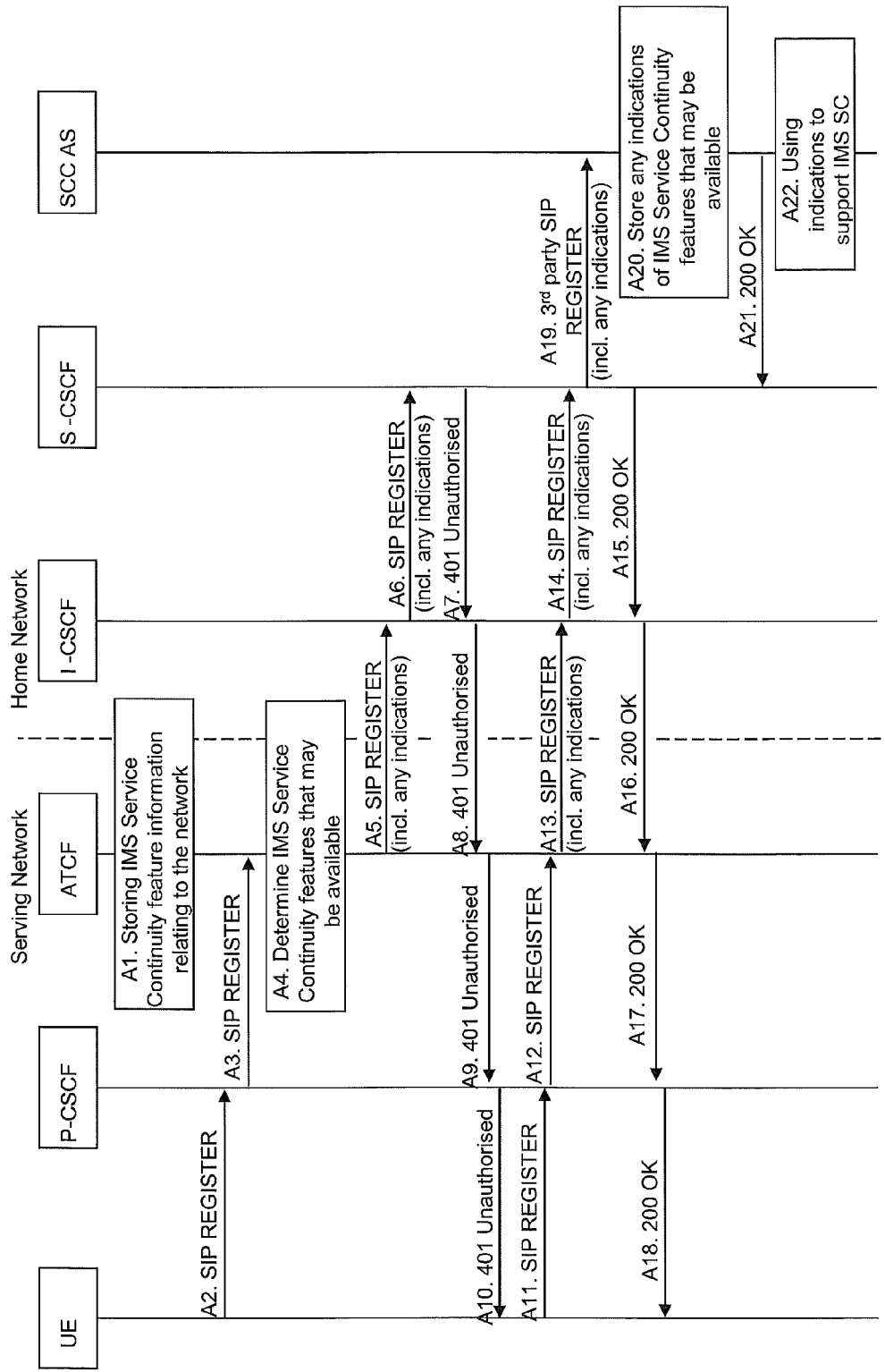
FIG. 2 is a signalling flow diagram illustrating an example of the process of an IMS Registration.

FIG. 2 is a signalling flow diagram illustrating an example of the process of an IMS Registration in which the ATCF includes indications of any IMS Service Continuity features that may be available to the UE. The steps performed are as follows:

A1. An ATCF within a serving network is configured with information regarding the IMS Service Continuity features that are supported by the MSC servers located within the serving network.

A2. A UE located within the serving network (visited network if roaming) initiates an IMS Registration by sending a SIP REGISTER request message towards its home network.

A3. A P-CSCF within the serving network receives the SIP REGISTER request message and forwards this message to the ATCF within the serving network.

A4. The ATCF receives the SIP REGISTER request message and identifies IMS Service Continuity Features that may be available to the UE within the serving network. To do so, the ATCF uses the information regarding the IMS Service Continuity features that are supported by the MSC servers located within the serving network that has been configured at the ATCF. In addition, the ATCF can also take into account whether or not it supports the IMS Service Continuity features and/or whether or not the UE is authorized to use the IMS Service Continuity features, as described above.

A5. For any IMS Service Continuity features that the ATCF determines may be available to the UE, the ATCF then includes an indication that the IMS Service Continuity feature may be available in the SIP REGISTER request message and forwards the message onto the home network of the UE.

A6. An I-CSCF within the home network receives the SIP REGISTER request message, including any indications of the IMS Service Continuity feature that may be available to the UE, and forwards the SIP REGISTER request message to a S-CSCF within the home network.

A7. As the user of the UE has not yet been authenticated, the S-CSCF rejects the initial SIP REGISTER request, and sends a SIP 401 Unauthorized response message back to the UE including an authentication challenge. The authentication challenge is based on an authentication vector for the user that the S-CSCF retrieves from a HSS (not shown).

A8 to A10. The SIP 401 Unauthorized response message is routed back to the UE via the I-CSCF in the home network, and the ATCF and P-CSCF in the serving network.

A11. The UE receives the SIP 401 Unauthorized response message including the authentication challenge, and generates a response to the authentication challenge. The UE then sends a further SIP REGISTER request message towards its home network, this further SIP REGISTER request message including the authentication response.

A12. The P-CSCF within the serving network receives the further SIP REGISTER request message and forwards this message to the ATCF within the serving network.

A13. Once again, for any IMS Service Continuity features that the ATCF determines may be available to the UE, the ATCF includes an indication that the IMS Service Continuity feature may be available in the further SIP REGISTER request message and forwards the message onto the home network of the UE.

A14. The I-CSCF within the home network receives the further SIP REGISTER request message, including any indications of the IMS Service Continuity feature that may be available to the UE, and forwards the further SIP REGISTER request message to the S-CSCF.

A15. The S-CSCF receives the further SIP REGISTER request message and verifies the authentication response. The S-CSCF authenticates the user if the verification is successful, and sends a SIP 200 OK response message back to the UE to indicate that the registration was successful.

A16 to A18. The SIP 200 OK response message is routed back to the UE via the I-CSCF in the home network, and the ATCF and P-CSCF in the serving network.

A19. The S-CSCF also sends a third party SIP REGISTER request message to a SCC AS within the home network, with which the S-CSCF registers the user with the SCC AS on the user's behalf. The third party SIP REGISTER request message includes any indications of the IMS Service Continuity feature that may be available to the UE that were included in the further SIP REGISTER request message. For example, 3GPP TS 24.229 Rel-10 section 5.4.1.7 sets out procedures regarding the inclusion by the S-CSCF of the contents of an incoming SIP REGISTER request in the body of a third party SIP REGISTER request.

A20. The SCC AS receives the third party SIP REGISTER request message and stores any indications of the IMS Service Continuity feature that may be available to the UE for the duration of this registration.

A21. The SCC AS responds to the S-CSCF with a SIP 200 OK response message.

A22. The SCC AS can then use the information that has been provided by the ATCF to support the provision of IMS Service Continuity to the UE.

Following this IMS registration procedure, the SCC AS can then use the information that has been provided by the ATCF to support the provision of IMS Service Continuity to the UE. In particular, for any IMS Service Continuity features that the third party registration indicates may be available to the UE, the SCC AS can include an indication that the IMS Service Continuity feature may be available in a further message that is sent toward the UE, such as a request to establish an IMS session or a response to a request to establish an IMS session. In addition, the SCC AS can also take the indicated IMS Service Continuity features into account when the implementation of SRVCC procedures is initiated. At this stage, the SCC AS can decide, based upon which features are supported, which procedures can be applied and therefore which IMS sessions can be transferred. By way of example:

if the information indicates that no features are supported, then only the latest active session is transferred;

if the information indicates that MSC server assisted mid-call feature is supported, then both one active and one held session can be transferred (if available);

if the information indicates that SRVCC for video calls is supported, then the video media can be transferred;

if the information indicates that SRVCC for calls in alerting state is supported, then a call in alerting phase can be transferred (if available).

Figure 3:
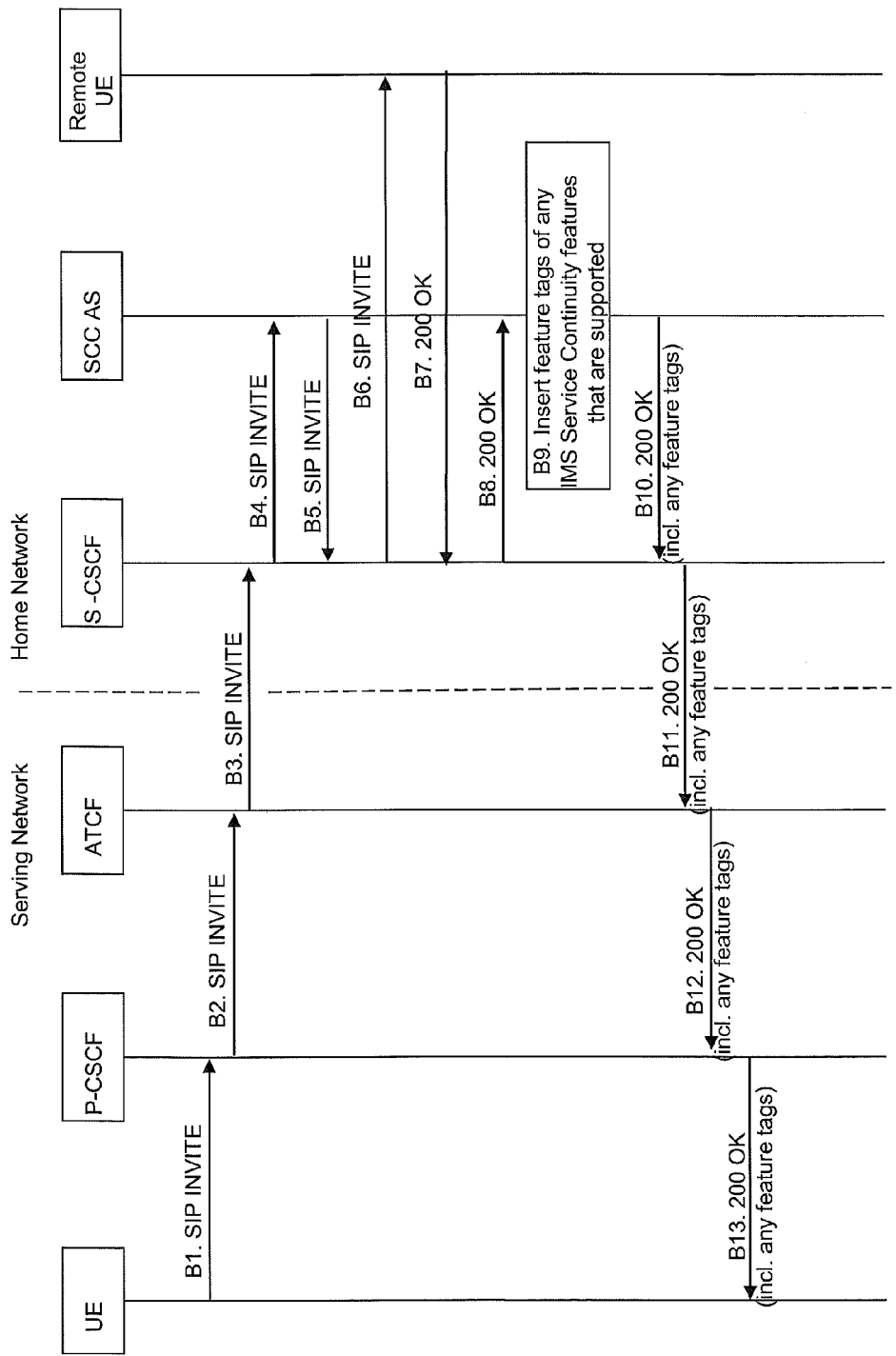
FIG. 3 is a signalling flow diagram illustrating an example of the process of establishing an IMS session originating at the UE.

FIG. 3 is a signalling flow diagram illustrating an example of the process of establishing an IMS session originating at the UE in which the SCC AS provides the UE with indications of any IMS Service Continuity features that may be available to the UE. The steps performed are as follows:

B1. The UE initiates the establishment of an IMS session with a remote UE by sending a SIP INVITE request message towards the remote UE. The UE may also include feature tags to indicate which of the IMS Service Continuity features that it supports (e.g. the UE may include feature tags indicating support of MSC server assisted mid-call feature and/or SRVCC for calls in alerting state).

B2. A P-CSCF within the serving network receives the SIP INVITE request message and forwards this message to the ATCF.

B3. The ATCF receives the SIP INVITE request message and forwards the message onto the S-CSCF in home network of the UE, the S-CSCF having been discovered during the registration procedures.

B4. The S-CSCF within the home network receives the SIP INVITE request message. The S-CSCF then implements service logic (using initial Filter Criteria (iFC)) that causes the SIP INVITE request to be forwarded to the SCC AS, B5. The SCC AS receives the SIP INVITE request message and anchors the session. The SCC AS returns the SIP INVITE back to the S-CSCF in order to complete the session setup.

B6. The S-CSCF then forwards the SIP INVITE request message towards the remote UE. For example, the S-CSCF identifies an I-CSCF within the home network of the remote UE, by sending the host part of the destination address to a Domain Name System (DNS) server, and sends the SIP INVITE request message to the identified I-CSCF (not shown).

B7. In order to accept the session, the remote UE sends a SIP 200 OK response message back towards the UE.

B8. The S-CSCF within the home network of the UE receives the SIP 200 OK response message sent by the remote UE and forwards this on to the SCC AS.

B9. The SCC AS uses the stored indications (received in the third party SIP REGISTER request message) to determine if any of the IMS Service Continuity features are supported for the UE and, for those IMS Service Continuity feature that are supported, inserts the associated feature tag into the SIP 200 OK response message. For example, if the MSC Server assisted mid-call feature is supported for the UE, then the g.3gpp.mid-call media feature tag is included in the Contact header field of the SIP 200 OK response message. By way of further example, if SRVCC for calls in alerting phase is supported for the UE, then the g.3gpp.srvcc-alerting media feature tag is included in the Record-Route header field of the SIP 200 OK response message.

B10 to B13. The SIP 200 OK response message is then routed back to the UE via the S-CSCF in the home network, and the ATCF and P-CSCF in the serving network.

Whilst in the example outlined above the SCC AS inserts feature tags into a SIP 200 OK response sent from the remote UE, the SCC AS could equally insert feature tags into any response sent by the remote UE. For example, the SCC AS could insert the appropriate feature tags into an informational response (i.e. a 1XX response) sent by the remote UE, such as a SIP 180 Ringing response message. By way of further example, the SCC AS could insert the appropriate feature tags into any success response (i.e. a 2XX response) sent by the remote UE, such as a SIP 202 Accepted response message.

Figure 4:
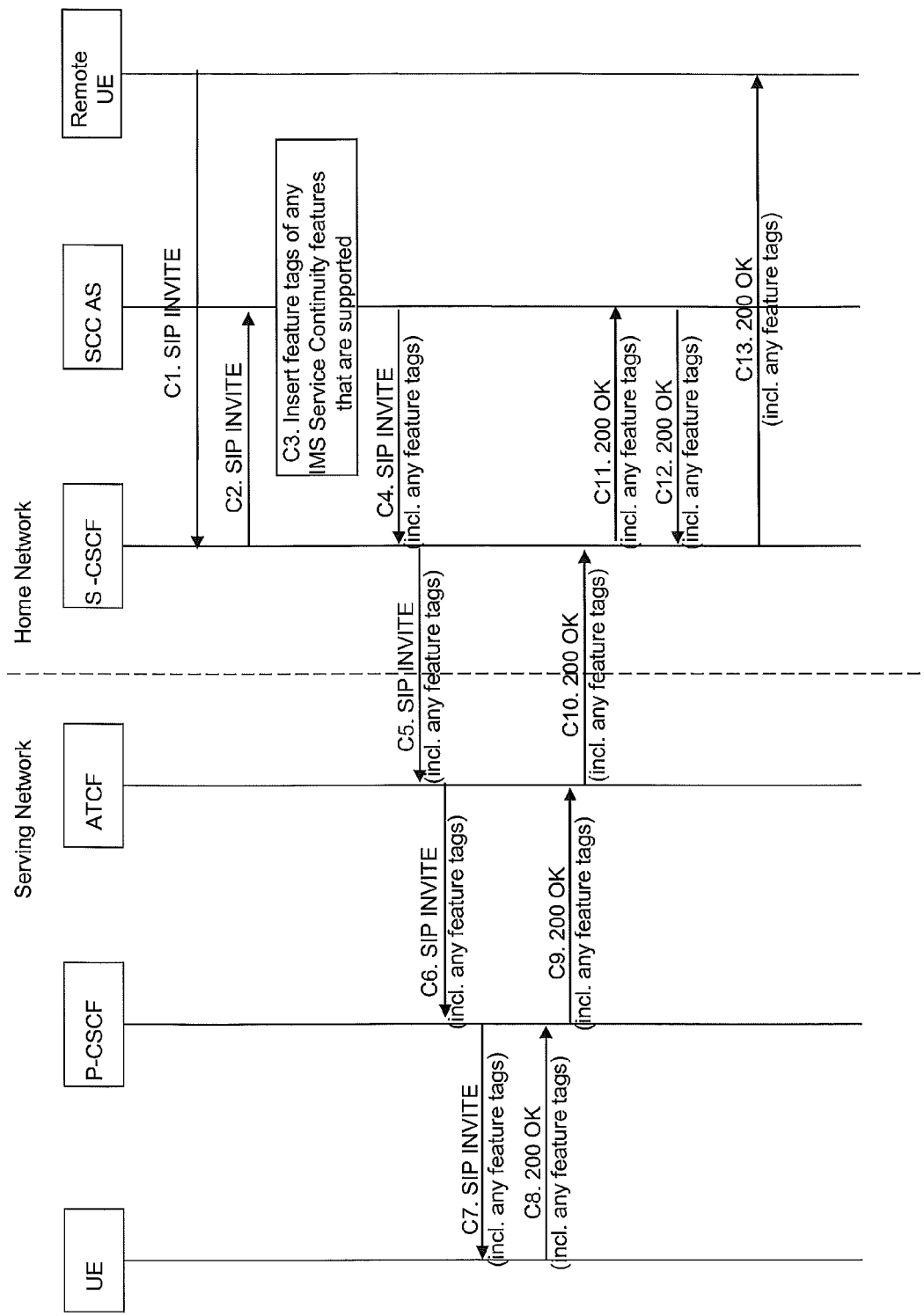
FIG. 4 is a signalling flow diagram illustrating an example of the process of establishing an IMS session terminating at the UE.

FIG. 4 is a signalling flow diagram illustrating an example of the process of establishing an IMS session terminating at the UE in which the SCC AS provides the UE with indications of any IMS Service Continuity features that may be available to the UE. The steps performed are as follows:

C1. A remote UE initiates the establishment of an IMS session with the UE by sending a SIP INVITE request message towards the UE.

C2. The SIP INVITE request message is routed to the S-CSCF within the home network of the UE. The S-CSCF within the home network receives the SIP INVITE request message and implements service logic (using initial Filter Criteria (iFC)) that causes the SIP INVITE request to be forwarded to the SCC AS.

C3. The SCC AS receives the SIP INVITE request message and anchors the session. The SCC AS uses the stored indications (received in the third party SIP REGISTER request message) to determine if any of the IMS Service Continuity features are supported for the UE and, for those IMS Service Continuity feature that are supported, inserts the associated feature tag into the SIP INVITE request message. For example, if the MSC Server assisted mid-call feature is supported for the UE, then the g.3gpp.mid-call media feature tag is included in the Contact header field of the SIP INVITE request message. By way of further example, if SRVCC for calls in alerting phase is supported for the UE, then the g.3gpp.srvcc-alerting media feature tag is included in the in the Record-Route header field of the SIP INVITE request message.

C4 to C7. The SIP INVITE request message including any feature tags is then routed to the UE via the S-CSCF in the home network, and the ATCF and P-CSCF in the serving network.

C8. In order to accept the session, the UE sends a SIP 200 OK response message back towards the remote UE. The SIP 200 OK response message also includes any feature tags that were included in the SIP INVITE request message.

C9 to C13. The SIP 200 OK response message is then routed back to the remote UE via the P-CSCF and ATCF in the serving network, and the S-CSCF and SCC AS in the home network.

Whilst in the example outlined above the UE may insert feature tags into a SIP 200 OK response, the UE could equally insert feature tags into any response sent. For example, the UE could insert the appropriate feature tags into an informational response (i.e. a 1XX response), such as a SIP 180 Ringing response message. By way of further example, the UE could insert the appropriate feature tags into any success response (i.e. a 2XX response), such as a SIP 202 Accepted response message.

FIG. 5 illustrates schematically an example of an ATCF 1 suitable for implementing the methods described above. The ATCF 1 can be implemented as a combination of computer hardware and software. The ATCF 1 comprises a processor 3, a memory 4, a receiver 5 and a transmitter 6. The memory 4 stores the various programs/executable files that are implemented by the processor 3, and also provides a storage unit for any required data. For example, this data can include but is not limited to information regarding the IMS Service Continuity features that are supported by the ATCF and by the MSC servers located within the serving network, and information that can be used to identify the IMS Service Continuity features that a UE is authorized to use. The programs/executable files stored in the memory 4, and implemented by the processor 3, include but are not limited to a Feature Availability Determination Unit 7 and an Indication Insertion Unit 8. The Feature Availability Determination Unit 7 determines the IMS Service Continuity features that may be available to a UE, and, for any IMS Service Continuity features that may be available, the Indication Insertion Unit 8 includes an indication that the IMS Service Continuity feature may be available a message sent via the ATCF 1.

FIG. 6 illustrates schematically an example of an SCC AS 2 suitable for implementing the methods described above. The SCC AS 2 can be implemented as a combination of computer hardware and software. The SCC AS 2 comprises a processor 9, a memory 10, a receiver 11 and a transmitter 12. The memory 10 stores the various programs/executable files that are implemented by the processor 9, and also provides a storage unit for any required data. For example, this data can include but is not limited to any received indications of any IMS Service Continuity features that may be available to UE in the serving network. The programs/executable files stored in the memory 410, and implemented by the processor 9, include but are not limited to an Indication Insertion Unit 13. The Indication Insertion Unit 13 includes indications of any IMS Service Continuity features that are supported in a message that is to be sent to the UE in order to establish an IMS session. For example, these indications could take the form of feature tags associated with the supported IMS Service Continuity features.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer readable medium may include an electronic, magnetic, optical, electromagnetic, or semiconductor data storage system, apparatus, or device. More specific examples of the computer readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

It will be appreciated by the person of skill in the art that various modifications may be made to the above-described embodiments without departing from the scope of the present invention. For example, whilst the above-described embodiments refer to IMS Service Continuity features that include the MSC server assisted mid-call feature, SRVCC for calls in alerting state, SRVCC for video calls, and multimedia priority services for SRVCC, the methods and apparatus described above could equally be used to support any IMS Service Continuity features (e.g. modes of session continuity/access transfer), including those not yet envisioned.

The invention claimed is:

1. A method of operating a node of a serving network, where the node is configured to provide an IP Multimedia Subsystem, IMS, Access Transfer Control Function, ATCF, the method comprising:
   storing information regarding IMS Service Continuity features that are supported by Mobile Switching Center, MSC, servers within the network; and
   upon receipt of a message requesting IMS registration of a user equipment, using the information to determine the IMS Service Continuity features available to the user equipment, and,
   for IMS Service Continuity features that—are available, including, by the node, an indication in the message of the determined IMS Service Continuity features available, and forwarding the message towards a Service Centralization and Continuity Application Server, SCC AS,
   wherein the node is not a Serving Call Session Control Function, S-CSCF.

2. A method as claimed in claim 1, wherein the step of using the information to determine the IMS Service Continuity features that can be provided to the user equipment comprises:
   identifying the IMS Service Continuity features that are supported by the MSC servers in the serving network.

3. A method as claimed in claim 1, wherein the step of using the information to determine the IMS Service Continuity features that can be provided to the user equipment further comprises one or more of:
   identifying the IMS Service Continuity features that are supported by the ATCF; and
   identifying the IMS Service Continuity features that the user equipment is authorized to use.

4. A method as claimed in claim 3, wherein the step of identifying the IMS Service Continuity features that the user equipment is authorized to use further comprises:
   in response to determining that the user equipment is roaming in the serving network, identifying the IMS Service Continuity features based on a roaming agreement that exists between the serving network and a home network of the user equipment.

5. A method as claimed in claim 1, wherein the IMS Service Continuity features comprise one or more of:
   SRVCC for video calls; and
   multimedia priority services for SRVCC.

6. An apparatus configured to operate as an IP Multimedia Subsystem, IMS, Access Transfer Control Function, ATCF, within a serving network, the apparatus comprising:
   a memory for storing information regarding IMS Service Continuity features that are supported by Mobile Switching Center, MSC, servers within the serving network;
   a receiver for receiving a message requesting IMS registration of a user equipment;
   a processor that, upon receipt of the message, uses the information to determine the IMS Service Continuity features available to the user equipment, and, for IMS Service Continuity features that are available, the processor includes in the apparatus configured to operate as the IMS ATCF, an indication in the message of the determined IMS Service Continuity features available;
   and a transmitter for forwarding the message including the indication towards a Service Centralization and Continuity Application Server, SCC AS,
   wherein the apparatus is not configured to operate as a Serving Call Session Control Function, S-CSCF.

7. An apparatus as claimed in claim 6, wherein, when using the information to determine the IMS Service Continuity features that may be available to the user equipment, the processor is configured to identify the IMS Service Continuity features that are supported by the MSC servers in the serving network.

8. An apparatus as claimed in claim 7, wherein, when using the information to determine the IMS Service Continuity features that may be available to the user equipment, the processor is further configured to perform one or more of:
   identifying the IMS Service Continuity features that are supported by the ATCF; and
   identifying the IMS Service Continuity features that the user equipment is authorized to use.

9. An apparatus as claimed in claim 8, wherein the processor is further configured to identify the IMS Service Continuity features that the user equipment is authorized to use based upon a roaming agreement between the serving network and a home network of the user equipment, in response to determining that the user equipment is roaming in the serving network.

10. An apparatus as claimed in claim 8, wherein the memory is configured to store information regarding IMS Service Continuity features that comprise one or more of:
    SRVCC for video calls; and
    multimedia priority services for SRVCC.

11. An apparatus as claimed in claim 8, wherein the processor is configured to process indications regarding IMS Service Continuity features that comprise one or more of:
    SRVCC for video calls; and
    multimedia priority services for SRVCC.

* * * * *

UNITED STATES PATENT AND TRADEMARK OFFICE
CERTIFICATE OF CORRECTION

PATENT NO.       : 8,908,597 B2                     Page 1 of 1
APPLICATION NO.  : 13/197138
DATED            : December 9, 2014
INVENTOR(S)      : Sedlacek et al.

It is certified that error appears in the above-identified patent and that said Letters Patent is hereby corrected as shown below:

On the Title Page, Item (75), under "Inventors", in Column 1, Line 3, delete "Gavie (SE)" and insert -- Gävle (SE) --, therefor.

In the Specification

In Column 1, Line 9, delete "PCT/SE2011/063022," and insert -- PCT/EP2011/063022, --, therefor.

In Column 3, Line 23, delete "8.3.2)," and insert -- 8.3.2). --, therefor.

In Column 11, Line 12, delete "SCC AS," and insert -- SCC AS. --, therefor.

Signed and Sealed this
Twenty-first Day of July, 2015

Michelle K. Lee
*Director of the United States Patent and Trademark Office*